Patented Oct. 18, 1927.

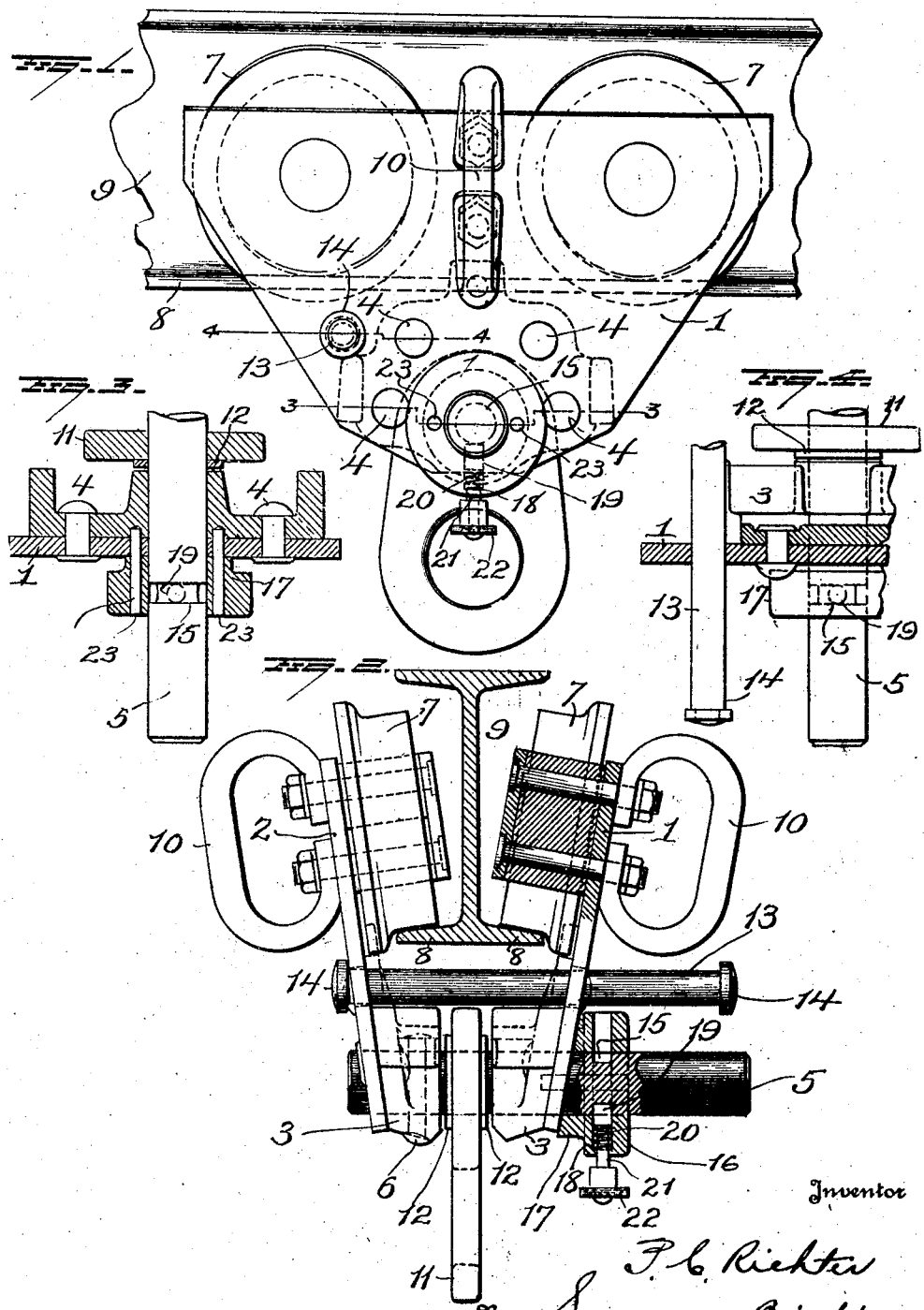

1,646,217

UNITED STATES PATENT OFFICE.

PAUL C. RICHTER, OF STAMFORD, CONNECTICUT, ASSIGNOR TO THE YALE & TOWNE MANUFACTURING COMPANY, OF STAMFORD, CONNECTICUT.

TROLLEY CONSTRUCTION.

Application filed November 19, 1925. Serial No. 70,130.

This invention relates to improvements in trolley constructions and more particularly to such as are employed with hoisting machines, one object of the invention being to provide simple means whereby the trolley may be removed from the I-beam rail on which it travels.

With this and other objects in view, the invention consists in certain novel features of construction and combination of parts as hereinafter set forth and pointed out in the claims.

In the accompanying drawings,—

Figure 1 is a view in side elevation showing an embodiment of my invention.

Figure 2 is a view partly in section and partly in elevation, taken at right angles to Figure 1.

Figure 3 is a section on the line 3—3 of Figure 1, and

Figure 4 is a section on the line 4—4 of Figure 1.

The trolley comprises two frame plates 1, 2, to each of which a hub casting 3 is riveted as at 4 and these hub castings provide suitable bearings for a bolt 5; to which bolt one of the hub castings 3 is rigidly secured by means of a rivet or bolt 6. Each frame plate carries two trolley wheels 7—7 to run on the lower lateral flanges 8 of an I-beam rail 9 and to each of said frame plates a handle 10 is secured.

Between the hub castings 3, a suspension link 11 is supported on the bolt 5 and maintained in proper position by means of collars 12. The bolt 5 is of sufficient length to project an appreciable distance laterally from the frame plate 1 so that said frame plate and the trolley wheels which it carries together with the hub casting 3 secured to said frame plate may be moved laterally to remove the trolley wheel 7 carried by this frame plate from the flange of rail 9. A rod 13 passes through the two frame plates 1 and 2 and projects some distance laterally from the plate 1, said rod having at each end a head 14.

The bolt 5 is provided with an annular groove 15 and encircling the grooved portion of said bolt, is a retaining collar 16 having a beveled portion 17 at one side to engage the adjacent frame plate 1. The collar 16 is provided with a socket or opening 18 which receives a plunger 19 to enter the groove 15 in the bolt, said plunger being normally forced into said groove by the action of a spring 20. The plunger 19 is provided with a stem 21 to which a manually operable knob or handle 22 is secured to facilitate the withdrawal of the plunger 19 from the groove 15 when the retaining collar is to be released from locked engagement with the bolt 5.

By withdrawing the bolt 19 from the groove 15, the collar 16 may be slid along the bolt 5 and removed therefrom. By now grasping the handle 10 on the frame plate 1, said frame plate and its hub casting may be moved in a manner to release the trolley wheels 7 carried by said frame plate from the track rail 9. By now grasping the handle 10 on both frame plates 1 and 2, the trolley structure as a whole may be removed from the track rail. When the trolley is assembled as shown in Figure 2, guide pins 23 may be employed to retain the collar 16 in proper position and these guide pins will also facilitate the accurate positioning of the collar 16 during the operation of assembling the trolley on the track rail.

When the plate 1 with the wheels mounted thereon is drawn laterally from the track, the rod 13 prevents the plate swinging around the bolt 5 and thereby maintains the plate in such relation to the plate 2 that no swinging adjustment of either plate is needed when mounting the trolley on the track. The frame plates are both kept in the same radial relation to the bolt 5 so that, to mount the trolley, it is necessary merely to raise the same past the rail flanges 8 with the wheels at the opposite sides of the same and then adjust the plate 1 to the position shown in Fig. 2.

Having fully described my invention what I claim as new and desire to secure by Letters-Patent, is:

1. A trolley structure comprising two frame members, a trolley wheel carried by each frame member, a bolt secured to one frame member and passing freely through the other frame member, a collar on said bolt and normally engaging the last mentioned frame member, and manually operable means for locking said collar to said bolt.

2. A trolley structure comprising two frame members, a trolley wheel carried by each frame member, a bolt passing transversely through said frame members and having fixed relation to one of them, said bolt passing freely through the other frame member, a collar on said bolt normally bearing against the outer side of the last mentioned frame member, and a spring pressed plunger carried by said collar, said bolt having a groove to receive said spring pressed plunger.

3. A trolley structure comprising two frame members, a trolley wheel carried by each frame member, a bolt passing through said frame members, one of said frame members being movable on said bolt, means cooperable with said bolt and the movable frame member to lock the latter in normal position, means whereby said locking means may be operated to release the movable frame member, and handles secured upon said frame members.

4. A trolley structure comprising two frame members, a trolley wheel carried by each frame member, a bolt passing through said frame members and secured to one only of them and projecting laterally beyond the other frame member, manually controlled locking means on said bolt and normally engaging the last mentioned frame member, a rod passing transversely through said frame members and laterally beyond one of them, said rod having heads at its respective ends, and handles on said frame members.

5. A trolley structure comprising two frame members, a bolt passing transversely through the frame members, means for securing the members in set relations longitudinally of the bolt and permitting their separation to effect release from a track, other means to prevent pivotal displacement of the frame members with respect to the bolt, and wheels on the frame members.

6. A trolley structure comprising two frame plates, trolley wheels on said plates, a bolt passing transversely through the plates and fixed to one of them, a collar slidably mounted on the bolt and having one end inclined to conform to and bear against the outer side of the adjacent frame plate, means for locking the collar on the bolt to secure the frame plate in a set position, and guide pins engaged with the collar and the frame plate to maintain the axial relation of the same.

In testimony whereof, I have signed this specification.

PAUL C. RICHTER.